US009518206B2

(12) United States Patent
Maghrabi et al.

(10) Patent No.: US 9,518,206 B2
(45) Date of Patent: Dec. 13, 2016

(54) INVERT EMULSION FLUID CONTAINING A HYGROSCOPIC LIQUID, A POLYMERIC SUSPENDING AGENT, AND LOW-DENSITY SOLIDS

(71) Applicant: HALLIBURTON ENERGY SERVICES, INC., Houston, TX (US)

(72) Inventors: Shadaab S. Maghrabi, Maharashtra (IN); Vikrant B. Wagle, Pune (IN); Dhanashree G. Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/450,217

(22) Filed: Aug. 2, 2014

(65) Prior Publication Data
US 2014/0357536 A1 Dec. 4, 2014

Related U.S. Application Data

(60) Division of application No. 13/473,903, filed on May 17, 2012, now Pat. No. 8,950,492, which is a continuation-in-part of application No. 13/187,170, filed on Jul. 20, 2011, now Pat. No. 9,376,608.

(51) Int. Cl.
C09K 8/00 (2006.01)
C09K 8/36 (2006.01)
C09K 8/42 (2006.01)
C09K 8/46 (2006.01)

(52) U.S. Cl.
CPC . C09K 8/00 (2013.01); C09K 8/36 (2013.01); C09K 8/424 (2013.01); C09K 8/46 (2013.01)

(58) Field of Classification Search
None
See application file for complete search history.

(56) References Cited

U.S. PATENT DOCUMENTS

| | | | |
|---|---|---|---|
| 5,072,794 A | 12/1991 | Hale et al. | |
| 5,198,416 A | 3/1993 | Hale et al. | |
| 5,494,120 A | 2/1996 | Hale et al. | |
| 5,955,401 A | 9/1999 | Liao | |
| 5,977,031 A | 11/1999 | Patel | |
| 6,054,416 A * | 4/2000 | Bland | 507/136 |
| 6,887,832 B2 | 5/2005 | Kirsner et al. | |
| 7,091,159 B2 | 8/2006 | Eoff et al. | |
| 7,462,580 B2 | 12/2008 | Kirsner et al. | |
| 7,488,704 B2 | 2/2009 | Kirsner et al. | |
| 7,906,461 B2 | 3/2011 | Dino et al. | |
| 7,939,470 B1 | 5/2011 | Wagle et al. | |
| 2006/0052261 A1 | 3/2006 | Kray et al. | |
| 2006/0058203 A1 | 3/2006 | Laufer et al. | |
| 2006/0081372 A1* | 4/2006 | Dealy et al. | 166/285 |
| 2008/0076682 A1 | 3/2008 | Jones et al. | |
| 2010/0009873 A1* | 1/2010 | Dino et al. | 507/117 |

FOREIGN PATENT DOCUMENTS

| | | | |
|---|---|---|---|
| CA | 2451926 A1 | 6/2005 | |
| EP | 2154224 A1 | 2/2010 | |
| GB | 2223255 A | * | 4/1990 |
| WO | WO 2009151567 A1 | * | 12/2009 |

OTHER PUBLICATIONS

Clark et al, Polyacrylamide/Potassium-Chloride Mud for Drilling Water-Sensitive Shales, Society of Petroleum Engineers, 5514, Jun. 1976, 719-27.
Reid, et al., Field Evaluation of a Novel Inhibitive Water-Based Drilling Fluid for Tertiary Shales, Society of Petroleum Engineers, 24979, 171-81, Nov. 16-18, 1992.
Burrows, et al., benchmark Performance: Zero Barite Sag and Significantly Reduced Downhole Losses with the Industry's First-Clay-Free Synthetic-Based Fluid, Society of Petroleum Engineers, 87138, 1-8, Mar. 2-4, 2004.
Oort, et al., New Flat-Rheology Synthetic-Based Mud for Improved Deepwater Drilling, Society of Petroleum Engineers, 90987, 1-11, Sep. 26-29, 2004.
Harlan, et al., Salt-Free internal Phase Oil Mud Provides Improved Performance, American Association of Drilling Engineers, AADE-06-DF-HO-08, 1-9, Apr. 11-12, 2006.
Accolade, Halliburton Energy Services, Inc. Literature, Dec. 2007.
Encore Base Product Data Sheet, Halliburton Energy Services, Inc. Literature, Apr. 5, 2010.
Baroid Product Data Sheet, Halliburton Energy Services, Inc. Literature, Mar. 25, 2010.
Baracarb Product Data Sheet, Halliburton Energy Services, Inc. Literature, Mar. 24, 2010.
Barodense Product Data Sheet, Halliburton Energy Services, Inc. Literature, Mar. 25, 2010.
Micromax, Halliburton Energy Services, Inc. Literature, Aug. 2007.
Adapta Product Data Sheet, Halliburton Energy Services, Inc. Literature, Mar. 2, 2010.
Innovert High Performance Paraffin/Mineral Oil-Based Fluids from Baroid, Halliburton Energy Services, Inc. Literature, May 2008.
Fann Model 35 Viscometer Product Information, Fann Instrument Company, 2007.

(Continued)

Primary Examiner — John J Figueroa
(74) Attorney, Agent, or Firm — McGuireWoods LLP

(57) ABSTRACT

An invert emulsion treatment fluid comprises: (A) an external phase, wherein the external phase comprises a hydrocarbon liquid; (B) an internal phase, wherein the internal phase comprises a hygroscopic liquid; (C) a suspending agent, wherein the suspending agent is a polymer, and wherein the polymer comprises urea linkages; and (D) a particulate, wherein the particulate has a density less than 3.5 g/cm$^3$, wherein a test fluid consisting essentially of the external phase, the internal phase, the suspending agent, and the particulate, and in the same proportions as the treatment fluid, and after static aging for 2 months at a temperature of 200° F. (93.3° C.), has a 10 minute gel strength of at least 30 lb/100 ft$^2$ (1,436 Pa) at a temperature of 120° F. (48.9° C.). A method of using the invert emulsion treatment fluid comprises: introducing the treatment fluid into a portion of a subterranean formation.

20 Claims, No Drawings

(56) References Cited

OTHER PUBLICATIONS

Escaid Hydrocarbon Fluids, Exxon Mobil Chemical Company, www.exxonmobilchemical.com/Chem-English/brands/hydrocarbon-oxygenated-fluids-applications-hydraulic-fracting.aspx?In=yourindustry, Nov. 24, 2015.

Novatec F Product Information Sheet, Mi SWACO, A Schlumberger Company, 2007.

Crayvallac LA-250 Technical Datasheet, Arkema, http://coatings.specialchem.com/product/a-arkema-crayvallac-la-250, Nov. 24, 2015.

TAU-MOD Product Data Sheet, Halliburton Energy Services, Inc. Literature, Sep. 3, 2010.

Invermul NT, Halliburton Energy Services, Inc. Literature, Mar. 26, 2010.

RM-63, Halliburton Energy Services, Inc. Literature, Mar. 26, 2010.

EZ MUL NT, Halliburton Energy Services, Inc. Literature, Mar. 26, 2010.

Rhemod L, Halliburton Energy Services, Inc. Literature, Aug. 31, 2010.

Le Supermul, Halliburton Energy Services, Inc. Literature, Mar. 26, 2010.

TORQ-TRIM II, Halliburton Energy Services, Inc. Literature, Mar. 26, 2010.

* cited by examiner

INVERT EMULSION FLUID CONTAINING A HYGROSCOPIC LIQUID, A POLYMERIC SUSPENDING AGENT, AND LOW-DENSITY SOLIDS

CROSS-REFERENCE TO RELATED APPLICATIONS

This application is a continuation-in-part of prior U.S. patent application Ser. No. 13/187,170, filed Jul. 20, 2011 and a Divisional of prior U.S. application Ser. No. 13/473,903, filed May 17, 2012.

TECHNICAL FIELD

An invert emulsion treatment fluid and methods of use are provided. The treatment fluid contains a hygroscopic liquid as the internal phase, a suspending agent of a polymer comprising urea linkages, and low-density particulates. In an embodiment, the polymer also comprises urethane linkages. In certain embodiments, the hygroscopic liquid is a salt solution and in other embodiments, the hygroscopic liquid comprises an alcohol. According to an embodiment, the treatment fluid is a fragile gel. In an embodiment, the treatment fluid does not contain an organophilic clay or lignite. According to some embodiments, the treatment fluid is used in a water-sensitive formation.

SUMMARY

According to an embodiment, an invert emulsion treatment fluid comprises: (A) an external phase, wherein the external phase comprises a hydrocarbon liquid; (B) an internal phase, wherein the internal phase comprises a hygroscopic liquid; (C) a suspending agent, wherein the suspending agent is a polymer, and wherein the polymer comprises urea linkages; and (D) a particulate, wherein the particulate has a density less than 3.5 g/cm$^3$, wherein a test fluid consisting essentially of the external phase, the internal phase, the suspending agent, and the particulate, and in the same proportions as the treatment fluid, and after static aging for 2 months at a temperature of 200° F. (93.3° C.), has a 10 minute gel strength of at least 30 lb/100 ft$^2$ (1,436 Pa) at a temperature of 120° F. (48.9° C.).

According to another embodiment, a method of treating a portion of a subterranean formation comprises: introducing the treatment fluid into the portion of a subterranean formation.

DETAILED DESCRIPTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, the test fluid consists essentially of the external phase, the internal phase, and the particulate. The test fluid can contain other ingredients so long as the presence of the other ingredients do not materially affect the basic and novel characteristics of the claimed invention, i.e., so long as the test fluid has a 10 minute gel strength of at least 30 lb/100 ft$^2$ (1,436 Pa) at a temperature of 120° F. (48.9° C.), after static aging for 2 months at a temperature of 200° F. (93.3° C.).

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, the term "emulsion" means a colloid in which an aqueous liquid is the continuous (or external) phase and a hydrocarbon liquid is the dispersed (or internal) phase. As used herein, the term "invert emulsion" means a colloid in which a hydrocarbon liquid is the external phase. Of course, there can be more than one internal phase of the emulsion or invert emulsion, but only one external phase. For example, there can be an external phase which is adjacent to a first internal phase, and the first internal phase can be adjacent to a second internal phase. Any of the phases of an emulsion or invert emulsion can contain dissolved materials and/or undissolved solids.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 30 lb/100 ft$^2$ (1,436 Pa) will become a gel. Alternatively, generally, a substance with a 10 minute gel strength less than 30 lb/100 sq ft (1,436 Pa) will remain in a fluid state. A flat gel indicates that the gelation of the substance is not gaining much strength with time; whereas, a progressive gel indicates that the gelation of the substance is rapidly gaining strength with time. A gel can be a fragile gel. A fragile gel is a fluid that acts like a gel when allowed to remain static for a period of time (i.e., no external force is applied to the fluid) thus exhibiting good suspending properties, but can be broken into a liquid or pumpable state by applying a force to the gel. Conversely, a progressive gel may not be breakable, or a much higher force may be required to break the gel.

Oil and gas hydrocarbons are naturally occurring in some subterranean formations. A subterranean formation containing oil or gas is sometimes referred to as a reservoir. A reservoir may be located under land or off shore. In order to produce oil or gas, a wellbore is drilled into a reservoir or adjacent to a reservoir.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is often desirable to treat at least a portion of a well with a treatment fluid. As used herein, a "treatment fluid" is a fluid designed and prepared to resolve a specific condition of a well or subterranean formation, such as for drilling, completion, stimulation, isolation, gravel packing, or control of reservoir gas or water. The term "treatment fluid" refers to the specific composition of the fluid as it is being introduced into a wellbore. The term "treatment" in the term "treatment fluid" does not necessarily imply any particular action by the fluid.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

During well completion, it is commonly desired to seal a portion of an annulus so fluids will not flow through the annulus but rather flow through the tubing string or casing. By sealing the portion of the annulus, oil or gas can be produced in a controlled manner through the wellhead via the tubing string or casing. Different tools can be used to create seals in the well. Examples of such tools include packers and bridge plugs.

A swellable packer or bridge plug can be utilized to seal the annulus in a wellbore. The packer or bridge plug can be contacted with a treatment fluid. The swellable packer and bridge plug includes a swellable element, which upon contact with the treatment fluid, can swell to a size that is larger than the size of the pre-swelled element. The swellable element is a ring fitted around the outside of a portion of a tubing string or casing or a mandrel attached to either. The swellable element is normally axially constrained on the top and bottom such that the swellable element can expand in a radial direction only. As the swellable element swells, it expands radially and seals the annulus.

During well completion, it is common to introduce a cement composition into a portion of an annulus in a wellbore. Cement compositions can also be used in primary or secondary cementing operations, well-plugging, or gravel packing operations. During well completion, for example, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead.

A spacer fluid can be introduced into the wellbore after a drilling operation and before a cement composition is introduced into the well. The spacer fluid can be circulated downwardly through a drill string or tubing string and up through the annulus. The spacer fluid functions to remove the treatment fluid from the wellbore. However, certain types of treatment fluids are more difficult to remove with a spacer fluid compared to other types of treatment fluids.

A treatment fluid can include low-density particulate, commonly called low-density solids. As used herein, a "low-density particulate" or "low-density solid" is a particulate having a density of less than 3.5 grams per cubic centimeters ($g/cm^3$). Low-density particulate can be included in a treatment fluid to, among other things, increase the overall density of the treatment fluid.

Some subterranean formations can be adversely affected by certain types of treatment fluids. One example of a formation that can be adversely affected by certain types of treatment fluids is a water-sensitive formation. One example of a treatment fluid that contains water is a "traditional" invert emulsion. A traditional invert emulsion contains a hydrocarbon liquid as the external phase and water as the internal phase. When a treatment fluid contains water, and the water comes in contact with a water-sensitive formation, then the water can adversely affect the subterranean formation. Some of the adverse effects can include swelling or sloughing of the subterranean formation, or gumbo formation.

An example of a water-sensitive formation is a shale formation. Shale formations are different from other types of formations, and there are even differences between individual shale formations. Typically, no two shale formations are the same. Therefore, finding ways to explore and develop shale gas from these formations is a challenge. However, exploration and production of shale gas as an alternative to natural gas produced from "traditional formations" continues to receive increased interest due to the vast quantity of unproduced shale gas around the world, especially in North America. For example, it is estimated that there is over 3 trillion cubic feet (Tcf) of shale gas in North America alone that is available for production.

In order to help minimize some of the adverse effects water can have on a water-sensitive formation, a traditional invert emulsion typically contains an internal phase of an aqueous solution of salt. The salt-water solution can accomplish several goals, including, lowering the activity of the internal phase of the emulsion, maintaining a sufficient hydrostatic pressure in the wellbore, and binding of the water molecules included in the internal phase.

Activity refers to the vapor pressure of water molecules in an aqueous solution compared with that of pure water. Activity is expressed mathematically as the ratio of two vapor pressures as follows: $a_w = p/p_o$, where p is the vapor pressure of the solution and $p_o$ is the vapor pressure of pure water. By increasing the concentration of salt (or other solutes) in the solution, $a_w$ decreases, because the vapor pressure of the solution decreases.

Hydrostatic pressure means the force per unit area exerted by a column of fluid at rest. Two factors that can affect the hydrostatic pressure are the density of the fluid and the depth of the fluid below the earth's surface or the surface of a body of water. Hydrostatic pressure can be calculated using the equation: $P = MW * depth * 0.052$, where MW is the density of the fluid in pounds per gallon (ppg), depth is the true vertical depth in feet, and 0.052 is a unit conversion factor to units of pounds per square inch (psi). A fluid overbalance is generally performed by placing a fluid, such as a completion brine, into the annulus at a hydrostatic pressure that exceeds the pressure exerted by fluids in the subterranean formation. In this manner, the greater pressure on the wall of the wellbore helps to keep the formation from collapsing into the annular space.

A substance that can bind water molecules is often referred to as a hygroscopic substance. Hygroscopicity is the ability of a substance to attract and hold water molecules from the surrounding environment through either absorption or adsorption. The hygroscopic nature of salt can lower the activity of a salt solution and can help prevent the water in the internal phase from flowing into and contacting the water-sensitive formation, thus minimizing swelling or sloughing of the formation. The hygroscopic nature of some alcohols can also lower the activity of an alcohol-water solution.

Commonly-used salts in a traditional invert emulsion include, but are not limited to, sodium chloride, calcium chloride, calcium bromide, potassium chloride, potassium bromide, magnesium chloride, potassium acetate, potassium formate, and magnesium sulfate, with the most common being calcium chloride.

In addition to salt, another common ingredient included in a traditional invert emulsion is an organophilic clay or organophilic lignite. As used herein, the term "organophilic" means a substance that associates with organic and oily surfaces and liquids and rejects aqueous systems. As used herein, the term "organophilic clay" and "organophilic lignite" means a clay or lignite that has been coated with a fatty-acid quaternary amine to make the substance oil dispersible. Commonly-used clays include bentonite, hectorite, attapulgite, and sepiolite. Recent technology, as described for example in U.S. Pat. Nos. 7,462,580 and 7,488,704, issued on Dec. 9, 2008 and Feb. 10, 2009 respectively to Jeff Kirsner et al., introduced "clay-free" invert emulsion-based treatment fluids, which offer significant advantages over treatment fluids containing organophilic clays. As used herein, the term "clay-free" means a treatment fluid that does not contain any organophilic clay or lignite.

Usually, an increase in the viscosity of a base fluid, excess colloidal solids, or both, will increase the plastic viscosity ("PV") of a fluid. Plastic Viscosity (PV) is obtained from the Bingham-Plastic rheological model and represents the viscosity of a fluid when extrapolated to infinite shear rate. The PV value can have an effect on the equivalent circulating density ("ECD") and the rate of penetration ("ROP") of a treatment fluid. ECD is the effective circulating density exerted by a fluid against the formation taking into account the flow rate and pressure drop in the annulus above the point being considered and measured as the difference in a treatment fluid's measured surface density at the well head and the treatment fluid's equivalent circulating density downhole. A low ECD is when the difference between the surface density and the equivalent circulating density downhole is relatively small. A high PV may increase the ECD due to a greater pressure drop in the annulus caused by internal fluid friction. A low PV may help minimize the amount of density increase, or equivalent circulating density caused by pumping the fluid. ROP is how quickly a drill bit forms a wellbore (i.e., the rate at which the drill bit penetrates a subterranean formation). A low PV may indicate that the fluid is capable of drilling rapidly because, among other things, the low viscosity of fluid exiting the drill bit and the ability to use an increased flow rate. In addition to desiring a low PV value, it is also desirable to have a low ECD and a high ROP.

Clay-free invert emulsion treatment fluids, like INNO-VERT® treatment fluid, marketed by Halliburton Energy Services, Inc., for example, have been shown to yield high performance in drilling, including lower ECD's and improved ROP.

There is a continuing need and thus ongoing industry-wide interest in new treatment fluids that provide improved performance while being environmentally-friendly and economical.

It has been discovered that an invert emulsion treatment fluid containing: an internal phase comprising a hygroscopic liquid; a polymeric suspending agent comprising urea or urea-urethane linkages, and low-density particulate can be used in oil or gas operations. The invert emulsion treatment fluid can also be used in water-sensitive formations, such as shale formations. According to certain embodiments, the invert emulsion treatment fluid does not contain an organophilic clay or organophilic lignite. The invert emulsion treatment fluid can be more environmentally-friendly and can provide improved performance compared to some traditional invert emulsion treatment fluids that use organophilic lay or lignite. The invert emulsion treatment fluid can include a hygroscopic liquid of either a salt solution or an alcohol solution and can have lower ECD's and a higher ROP compared to other treatment fluids. The low-density particulate can help improve the gel strength of the treatment fluid.

Some of the desirable properties of an invert emulsion treatment fluid is that the fluid: exhibits good rheology; has a low plastic viscosity, high yield point, and high low-shear yield point; is a gel; has a good shear strength; is stable; has a suitable sag factor; and exhibits low fluid loss into the subterranean formation.

If any test (e.g., rheology or fluid loss) requires the step of mixing, then the invert emulsion treatment fluid is mixed according to the following procedures. A known volume (in units of barrels) of the external phase is added to a mixing container and the container is then placed on a mixer base. The motor of the base is then turned on and maintained at 11,000 revolutions per minute (rpm). Any of the following ingredients are then added to the external phase and mixed for at least 5 minutes before adding the next ingredient, wherein the ingredients are added in order of the first ingredient to last ingredient as follows: an emulsifier and an emulsifier activator; a viscosifier; a filtercake control agent; the suspending agent; the internal phase; additional viscosifiers; low-density solids; and a weighting agent. The ingredients can be added at a stated concentration of weight by volume of the treatment fluid, for example, in units of pounds per barrel of the treatment fluid. It is to be understood that any mixing is performed at ambient temperature and pressure (about 71° F. (22° C.) and about 1 atm (0.1 MPa)).

It is also to be understood that if any test (e.g., rheology or fluid loss) requires the test be performed at a specified temperature and possibly a specified pressure, then the temperature and pressure of the treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min). After the treatment fluid is ramped up to the specified temperature and possibly pressure, the treatment fluid is maintained at that temperature and pressure for the duration of the testing.

A desirable property of a treatment fluid is for the fluid to exhibit good rheology. Rheology is a measure of how a material deforms and flows. As used herein, the "rheology" of a treatment fluid is measured according to API 13B-2 section 6.3, Recommended Practice for Field Testing of Oil-based Treatment fluids as follows. The treatment fluid is mixed and allowed to static age for a specified period of time at a specified temperature. The treatment fluid is placed into the test cell of a rotational viscometer, such as a FANN® Model 35 viscometer, fitted with a Bob and Sleeve attachment and a spring number 1. The treatment fluid is tested at the specified temperature and ambient pressure, about 1 atm (0.1 MPa). Rheology readings are taken at multiple rpm's, for example, at 3, 6, 100, 200, 300, and 600.

The plastic viscosity ("PV") of a treatment fluid is obtained from the Bingham-Plastic rheological model and calculated as the difference between the 600 rpm and 300 rpm dial readings from the rheology testing, expressed in units of cP. A Bingham plastic is a viscoplastic material that behaves as a rigid body at low stresses but flows as a viscous fluid at high stresses. It is desirable to have a low PV for a treatment fluid.

The yield point ("YP") is defined as the value obtained from the Bingham-Plastic rheological model when extrapolated to a shear rate of zero. As used herein, the "yield point" of a treatment fluid is calculated as the difference between the plastic viscosity and the 300 rpm dial reading, expressed in units of lb/100 ft². The yield point of a material is defined as the stress at which a material begins to deform plastically. Prior to reaching the yield point, the material will deform elastically and will return to its original shape when the applied stress is removed. However, once the yield point is exceeded, some fraction of the deformation will be permanent and non-reversible. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. A more convenient means of estimating the yield stress is by calculating the low-shear yield point ("LSYP") by subtracting (2*the 3 rpm reading) from the 6 rpm reading, expressed in units of lb/100 ft².

A substance can develop gel strength. As used herein, the "initial gel strength" of a treatment fluid is measured according to API 13B-2 section 6.3, Recommended Practice for Field Testing of Oil-based Treatment fluids as follows. After the rheology testing of the substance is performed, the substance is allowed to sit in the test cell for 10 seconds (s). The motor of the viscometer is then started at 3 rpm. The maximum deflection on the dial reading is the gel strength at 10 s in units of lb/100 ft². As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is the gel strength at 10 min in units of lb/100 ft².

Another desirable property of a gelled treatment fluid is a high shear strength. The shear strength of a treatment fluid can be used to indicate whether the treatment fluid has or will become a gel. Shear strength is the strength of a material or component against the type of yield or structural failure where the material or component shears and can be expressed in units of lb/100 ft². Shear strength is generally measured at a specified time after the treatment fluid has been mixed and the composition is tested at a specified temperature and possibly a specified pressure. For example, shear strength can be measured at a time in the range of about 48 to about 72 hours after the composition is mixed and the composition is tested at a temperature of 120° F. (49° C.). As used herein, the shear strength of a treatment fluid is measured as follows in accordance with API RP 13B-1, Appendix A. The treatment fluid is mixed and static aged for a specified time at a specified temperature. Next, a metal shear tube 3.5 inches (89 mm) in length, with an outside diameter of 1.4 inches (36 mm), and wall thickness of 0.008 inches (0.02 mm) is placed onto the surface of the treatment fluid. A platform or "stage" is then placed directly on top of the metal shear tube. Incremental amounts of a known weight are sequentially placed on the platform until the metal shear tube is submerged approximately 2 inches into the surface of the treatment fluid. The depth submerged is then accurately measured and recorded along with the combined weight of the platform and the incrementally added weights. When inches, grams, gallons, and pounds are the units employed, the following equation can be utilized to calculate shear strength:

$$S = \frac{3.61(Z + W)}{L} - 0.256\, A$$

where S=shear strength in lb/100 ft², Z=weight of shear tube in grams, W=total shear weight in grams (platform+incrementally added weights), L=submerged depth of shear tube in inches, and A is the treatment fluid density in lb/gal. A good result for shear strength of a gelled treatment fluid is greater than 20 lb/100 ft², when measured at a temperature of 71° F. and a pressure of 1 atmosphere after static aging for 2 months at a temperature of 200° F. (93.3° C.).

Another desirable property of a colloid is that the internal phase of the colloid is uniformly distributed throughout the external phase. In the case of an emulsion, a surfactant or an emulsifier can be used to uniformly distribute the internal liquid phase throughout the external liquid phase. In the case of a slurry, a suspending agent can be used to uniformly distribute the undissolved solids throughout the external liquid phase. As used herein, a "stable" invert emulsion treatment fluid means that the invert emulsion will not cream, flocculate, or coalesce and that the majority of any undissolved solids will not settle after being tested according to the test conditions listed below. As used herein, the term "cream" means at least some of the droplets of the internal phase converge towards the surface or bottom of the emulsion (depending on the relative densities of the liquids making up the external and internal phases). The converged droplets maintain a discrete droplet form. As used herein, the term "flocculate" means at least some of the droplets of the internal phase combine to form small aggregates in the emulsion. As used herein, the term "coalesce" means at least some of the droplets of the internal phase combine to form larger drops in the emulsion. Stability testing is performed according to API 13I Recommended Practice for Laboratory Testing of Treatment fluids, by placing the treatment fluid in a stainless steel ageing cell. The ageing cell is then pressurized with nitrogen gas to prevent the fluid from vaporizing and placed in a hot rolling oven at a specified temperature.

The container is then rolled at a specified temperature for a specified time. The ageing cell is then removed from the rolling oven and visually inspected to determine if the treatment fluid is stable.

Another desirable property of a treatment fluid is a good sag factor. As used herein, only treatment fluids that are considered "stable" after performing stability testing are tested for the "sag factor" (SF) as follows. The treatment fluid is placed into a high-temperature, high-pressure aging cell. The treatment fluid is then static aged at a specified temperature for a specified period of time. The specific gravity (SG) of the treatment fluid is measured at the top of the fluid and at the bottom part of the fluid in the aging cell. The sag factor is calculated using the following formula: $SF=SG_{bottom}/(SG_{bottom}+SG_{top})$. A sag factor of greater than 0.53 indicates that the fluid has a potential to sag; therefore, a sag factor of less than or equal to 0.53 is considered to be a good sag factor.

Another desirable property of a treatment fluid is a low fluid loss. As used herein, the "fluid loss" of a treatment fluid is tested according to API 13B-2 section 7, Recommended Practice for Field Testing of Oil-based Treatment fluids procedure at a specified temperature and pressure differential as follows. The treatment fluid is mixed. The heating jacket of the testing apparatus is preheated to approximately 6° C. (10° F.) above the specified temperature. The treatment fluid is stirred for 5 min. using a field mixer. The treatment fluid is poured into the filter cell. The testing apparatus is assembled with a filter paper inserted into the apparatus. The treatment fluid is heated to the specified temperature. When the treatment fluid reaches the specified temperature, the lower valve stem is opened and the specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min. The total mL of fluid loss is then multiplied by 2 to obtain the API fluid loss for the treatment fluid in units of mL/30 min.

Any of the ingredients included in the treatment fluid can be inherently biodegradable. Inherent biodegradability refers to tests which allow prolonged exposure of the test substance to microorganisms. As used herein, a substance with a biodegradation rate of >20% is regarded as "inherently primary biodegradable." A substance with a biodegradation rate of >70% is regarded as "inherently ultimate biodegradable." A substance passes the inherent biodegradability test if the substance is either regarded as inherently primary biodegradable or inherently ultimate biodegradable. As used herein, the "inherent biodegradability" of a substance is tested in accordance with the marine BODIS method—OSPAR Commission 2006 as follows. The test substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no test substance, is run in parallel. The biodegradation process is monitored by determination of DOC (or COD(2)) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

According to an embodiment, an invert emulsion treatment fluid comprises: (A) an external phase, wherein the external phase comprises a hydrocarbon liquid; (B) an internal phase, wherein the internal phase comprises a hygroscopic liquid; (C) a suspending agent, wherein the suspending agent is a polymer, and wherein the polymer comprises urea linkages; and (D) a particulate, wherein the particulate has a density less than 3.5 g/cm$^3$, wherein a test fluid consisting essentially of the external phase, the internal phase, the suspending agent, and the particulate, and in the same proportions as the treatment fluid, and after static aging for 2 months at a temperature of 200° F. (93.3° C.), has a 10 minute gel strength of at least 30 lb/100 ft$^2$ (1,436 Pa) at a temperature of 120° F. (48.9° C.).

According to another embodiment, a method of treating a portion of a subterranean formation comprises: introducing the treatment fluid into the portion of a subterranean formation.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid is an invert emulsion. The invert emulsion includes only one external phase and at least one internal phase. The external phase comprises a hydrocarbon liquid. The external phase can include dissolved materials or undissolved solids. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® treatment fluid and ACCOLADE® treatment fluid, marketed by Halliburton Energy Services, Inc.

The treatment fluid includes an internal phase. The internal phase comprises a hygroscopic liquid. According to an embodiment, the hygroscopic liquid comprises an alcohol. Preferably, the alcohol lowers the activity of the internal phase. According to an embodiment, the alcohol is a polyol and includes more than two hydroxyl groups. Preferably, the alcohol is water soluble. As used herein, the term "water soluble" means that more than 1 part of the substance dissolves in 5 parts of water. Preferably, the alcohol comprises a glycerol. The glycerol can be polyglycerol. One of the advantages to using glycerol compared to polyglycerol is that glycerol is less expensive than polyglycerol. As such, the cost of using glycerol can be comparable to invert emulsions that use salt instead of an alcohol. According to an embodiment, when the hygroscopic liquid comprises an alcohol, then the treatment fluid does not include a water-soluble salt. According to this embodiment, neither the hygroscopic liquid nor the water contains a dissolved salt. The internal phase can be in a concentration in the range of about 0.5% to about 60% by volume of the external phase. The internal phase can also be in a concentration of about 15% to about 45% by volume of the external phase. If the internal phase further includes water, then the water can be freshwater. The water can be in a concentration in the range of about 5% to about 90% by weight of the internal phase of the treatment fluid. If the internal phase includes the alcohol and water, then the alcohol can be in a concentration in the range of about 5% to about 90% by weight of the internal phase.

According to another embodiment, the hygroscopic liquid comprises a salt and a suitable solvent. The salt can be selected from the group consisting of sodium chloride, calcium chloride, calcium bromide, potassium chloride, potassium bromide, magnesium chloride, potassium acetate, potassium formate, magnesium sulfate, and combinations thereof. The suitable solvent can be any liquid that is capable of solubilizing the salt and forming a solution. One of skill in the art will be able to select the suitable solvent based on the specific salt used. According to an embodiment, the solvent is selected such that all of the salt dissolves in the solvent to form the hygroscopic liquid. It is to be understood that the internal phase can include other ingredients in addition to the salt and the suitable solvent. The other ingredients can be a liquid, solutes dissolved in the solvent, or undissolved solids. Examples of suitable solvents include, but are not limited to, water and an alcohol, such as methanol or ethanol. The water can be freshwater. The internal phase can be in a concentration in the range of about 0.5% to about 60% by volume of the external phase. The salt of the internal phase can be in a concentration in the range of about 2% to about 40% by weight of the internal phase. The solvent in the internal phase can be in a concentration in the range of about 60% to about 90% by weight of the internal phase. It is to be understood that the stated concentrations can differ depending on the specific salt and solvent that are used, as each salt will have its own unique maximum solubility in the particular solvent.

The treatment fluid includes a suspending agent. The suspending agent is a polymer comprising urea linkages. In an embodiment, the polymer further comprises urethane linkages. A polymer is a large molecule composed of repeating units typically connected by covalent chemical bonds. A polymer can be formed from the polymerization reaction of monomers. A polymer formed from one type of monomer is called a homopolymer. A copolymer is formed from two or more different types of monomers. In the polymerization reaction, the monomers are transformed into the repeating units of a polymer. For a copolymer, the repeating units for each of the monomers can be arranged in various ways along the polymer chain. For example, the repeating units can be random, alternating, periodic, or block. A polymer can also be formed in a step-wise fashion. For example, a first polymer, commonly called a pre-polymer, can first be formed from the polymerization of one or more different types of monomers. In the second step, the pre-polymer can be polymerized with a final monomer(s) to form the polymer. A polymer can also be formed in a step-wise fashion by first polymerizing two different pre-polymers, and then polymerizing both of the pre-polymers to form the polymer. A polymer has an average molecular weight, which is directly related to the average chain length of the polymer. The average molecular weight for a copolymer can be expressed as follows:

$$\text{Avg. molecular weight} = (M.W.m_1 * RUm_1) + (M.W.m_2 * RUm_2) \ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. For a polymer that is formed in a step-wise fashion, the molecular weight of the polymer is: the average molecular weight of the pre-polymer plus the molecular weight of the final monomer(s) times the number of repeating units of the final monomer(s); or the average molecular weight of both of the pre-polymers added together.

A compound containing an isocyanate functional group can be referred to as an isocyanate, a compound containing an amine functional group can be referred to as an amine, and a compound containing a hydroxyl functional group can be referred to as an alcohol. A di-isocyanate is a compound containing two isocyanate functional groups, a diamine is a compound containing two amine functional groups, and a diol is a compound containing two hydroxyl groups. A pre-polyamine is a pre-polymer containing multiple amine functional groups, a pre-polyol is a pre-polymer containing multiple hydroxyl functional groups, a pre-polyisocyanate is a pre-polymer containing multiple isocyanate functional groups, and a pre-polyurethane is a pre-polymer formed from the polymerization of a first monomer containing at least one isocyanate functional group and a second monomer containing at least one hydroxyl functional group and contains multiple isocyanate functional groups. The multiple functional groups of the pre-polymer are available to bond with available functional groups of the final monomer or the available functional groups of another pre-polymer. Any of the monomers and pre-polymers can be aliphatic or aromatic.

The suspending agent can be a polymer comprising urea linkages or urea and urethane linkages. The following examples illustrate some of the possible ways of forming a polymer comprising urea or urea and urethane linkages, but are not meant to represent all of the possible ways of forming the polymer. A polymer comprising urea linkages is formed from the combination of a compound containing two or more isocyanate functional groups and a compound containing two or more amine functional groups, and can be formed by: 1) polymerizing a first monomer of di-isocyanate and a second monomer of diamine; 2) forming a pre-polyisocyanate and then polymerizing the pre-polyisocyanate with a final monomer of diamine; 3) forming a pre-polyamine and then polymerizing the pre-polyamine with a monomer of di-isocyanate; or 4) forming a pre-polyisocyanate and a pre-polyamine and then polymerizing both of the pre-polymers. A polymer comprising urea and urethane linkages is formed from the combination of a compound containing two or more isocyanate functional groups, a compound containing two or more amine functional groups, a compound containing two or more hydroxyl functional groups, or a compound containing combinations of isocyanate, amine, and hydroxyl functional groups, and can be formed by: 1) polymerizing a monomer of di-isocyanate with a mixture of the monomers diol and diamine; 2) forming a pre-polyurethane and then polymerizing the pre-polyurethane with a monomer of diamine; 3) forming a polyisocyanate, polyamine, or polyol pre-polymer and then polymerizing the pre-polymer with the remaining monomers that contain the necessary functional groups (e.g., forming a pre-polyamine and then polymerizing the pre-polyamine with a mixture of monomers containing diol and diamine); or 4) forming more than one pre-polymer and then polymerizing all of the pre-polymers, plus any remaining monomers that contain the necessary functional groups. It is to be understood that any of the compounds containing the necessary functional group can be a monomer or part of a pre-polymer. Of course the pre-polymer can include more than one of the necessary functional groups. It is also to be understood that the polymer and any of the pre-polymers can be natural polymers or synthetic polymers, including resins.

Examples of suitable compounds (e.g., monomers or pre-polymers) containing two or more isocyanate functional groups include, but are not limited to: hexamethylene-diisocyanate (HDI); toluene-diisocyanate (TDI); 2,2'-, 2,4'- and 4,4'-diisocyanatodiphenylmethane (MDI); polymethyl-enepolyphenyl diisocyanate (PMDI); naphthalene-diisocyanate (NDI); 1,6-diisocyanato-2,2,4-trimethylhexane; isophorone-diisocyanate; (3-isocyanato-methyl)-3,5,5-trimethyl cyclohexyl isocyanate (IPDI); tris(4-isocyanato-phenyl)-methane; phosphoric acid tris-(4-isocyanato-phenyl ester); and thiophosphoric acid tris-(4-isocyanato-phenyl ester).

Examples of suitable compounds (e.g., monomers or pre-polymers) containing two or more amine functional groups include, but are not limited to: hydrazine; ethylenediamine; 1,2-propylenediamine; 1,3-propylenediamine; 1-amino-3-methylaminopropane; 1,4-diaminobutane; N,N'-dimeth-1-ethylenediamine; 1,6-diaminohexane; 1,12-diaminododecane; 2,5-diamino-2,5-dimethylhexane; trimethyl-1,6-hexane-diamine; diethylenetriamine; N,N',N''-trimethyldiethylenetriamine; triethylenetetraamine; tetraethylenepentamine; pentaethylenehexamine; and polyethyleneimine, having average molecular weights of between 250 and 10,000; dipropylenetriamine; tripropylenetetraamine; bis-(3-aminopropyl)amine; bis-(3-aminopropyl)-methylamine; piperazine; 1,4-diaminocyclohexane; isophoronediamine; N-cyclohexyl-1,3-propanediamine; bis-(4-amino-cyclohexyl)methane; bis-(4-amino-3-methyl-cyclohexyl)-methane; bisaminomethyltricyclodecane (TCD-diamine); o-, m- and p-phenylenediamine; 1,2-diamino-3-methylbenzene; 1,3-diamino-4-methylbenzene (2,4-diaminotoluene); 1,3-bisaminomethyl-4,6-dimethylbenzene; 2,4- and 2,6-diamino-3,5-diethyltoluene; 1,4- and 1,6-diaminonaphthalene; 1,8- and 2,7-diaminonaphthalene; bis-(4-amino-phenyl)-methane; polymethylene-polyphenylamine; 2,2-bis-(4-aminophenyl)-propane; 4,4'-oxybisaniline; 1,4-butanediol bis-(3-aminopropyl ether); 2-(2-aminoethylamino)ethanol; 2,6-diamino-hexanoic acid; liquid polybutadienes or acrylonitrile/butadiene copolymers which contain amino groups and have average molecular weights of between 500 and 10,000; and polyethers containing amino groups, e.g., based on polyethylene oxide, polypropylene oxide or polytetrahydrofuran and having a content of primary or secondary amino groups of from 0.25 to approximately 8 mmol/g, preferably 1 to 8 mmol/g. Such compounds are described in: US Patent Publication No. US 2006/0052261 A1, having for named inventors Bernd Kray, Wilhelm Laufer, Patrick Galda, and Achim Fessenbecker, published on Mar. 9, 2006; and US Patent Publication No. US 2006/0058203 A1, having for named inventors Willhelm Laufer, Michael Wuehr, Klaus Allgower, and Patrick Galda, published on Mar. 16, 2006, each of which is incorporated by reference in its entirety. If there is any conflict between a reference incorporated by reference and the present disclosure, the present disclosure will control.

Examples of suitable compounds (e.g., monomers or pre-polymers) containing two or more hydroxyl functional groups include, but are not limited to: polyether polyols, polyester polyols, polycaprolactone polyols, polycarbonate polyols, and combinations thereof.

An example of a suitable commercially-available polymer containing urea linkages (i.e., polyurea) is ADDITIN® M 10411, available from LANXESS India Private Limited, Business Unit—Rhein Chemie in Maharashtra, India. An example of a suitable commercially-available polymer containing urea and urethane linkages (i.e., polyurea-urethane) is CRAYVALLAC LA-250, available from Cray Valley in Paris, France.

The suspending agent can be inherently biodegradable. In an embodiment, the suspending agent is selected such that the emulsion is stable. For example, any undissolved solids in the treatment fluid do not settle to the bottom of the fluid. The suspending agent can be selected such that the treatment fluid has a sag factor less than or equal to 0.53. The suspending agent can be in at least a sufficient concentration such that the treatment fluid has a sag factor less than or equal to 0.53. According to another embodiment, the suspending agent is selected and is in a sufficient concentration such that the treatment fluid is a fragile gel. According to this embodiment, the suspending agent is selected and is in a sufficient concentration such that the treatment fluid has a 10 minute gel strength of at least 30 lb/100 ft$^2$ (1,436 Pa), alternatively greater than 50 lb/100 ft$^2$ (2,394 Pa) at a temperature of 120° F. (48.9° C.) and a time of 48 hours. According to another embodiment, the suspending agent is selected and is in a sufficient concentration such that the treatment fluid has a shear strength of at least 20 lb/100 ft$^2$ (958 Pa), alternatively greater than 30 lb/100 ft$^2$ (1,469 Pa), at a temperature of 200° F. (93.3° C.) and a time of 6 days. In another embodiment, the suspending agent is in a concentration of at least 1 pounds per barrel (ppb) of the treatment fluid. The suspending agent can also be in a concentration in the range of about 0.25 to about 15 ppb of the treatment fluid. In an embodiment, the suspending agent is in a concentration in the range of about 2 to about 8 ppb of the treatment fluid.

The treatment fluid includes a particulate. As used herein, the term "particulate" means a small discrete mass of solid matter. Furthermore, the term "particulate" is both a singular and plural word, pertaining to a single mass of solid matter and also to two or more masses of solid matter. According to an embodiment, the particulate has a density less than 3.5 g/cm$^3$. According to another embodiment, the particulate has a density in the range of about 1 to about 3.5 g/cm$^3$, preferably about 2 to about 3 g/cm$^3$.

The size of the particulate can vary. The size of the particulate can be the same or different. Without being limited by theory, it is believed that the suspending agent forms a polymeric network in the treatment fluid. The network can contain pores. The dimensions of the pores can vary. According to an embodiment, the particulate has a size such that the particulate is capable of being suspended adjacent to or within the pores or the lattice of the network. The particulate can have a size distribution range such that the majority of the particulate is capable of being suspended adjacent to or within the pores or the lattice of the network.

The particulate can be inherently biodegradable. In an embodiment, the particulate is selected such that the emulsion is stable. For example, any undissolved solids in the treatment fluid do not settle to the bottom of the fluid. The particulate can be selected such that the treatment fluid has a sag factor less than or equal to 0.53. The particulate can be in at least a sufficient concentration such that the treatment fluid has a sag factor less than or equal to 0.53. According to another embodiment, the particulate is selected and is in a sufficient concentration such that the treatment fluid is a fragile gel. According to this embodiment, the particulate is selected and is in a sufficient concentration such that the treatment fluid has a 10 minute gel strength of at least 30 lb/100 ft$^2$ (1,436 Pa), alternatively greater than 50 lb/100 ft$^2$ (2,394 Pa) at a temperature of 120° F. (48.9° C.) and a time of 48 hours, preferably a time of 2 months. According to another embodiment, the particulate is selected and is in a sufficient concentration such that the treatment fluid has a shear strength of at least 20 lb/100 ft$^2$ (958 Pa), alternatively greater than 30 lb/100 ft$^2$ (1,469 Pa), at a temperature of 200° F. (93.3° C.) and a time of 6 days, preferably a time of 2 months. According to another embodiment, the suspending agent and the particulate are selected and are in a sufficient concentration such that the treatment fluid is a fragile gel. According to this embodiment, the suspending agent and the particulate are selected and are in a sufficient concentration such that the treatment fluid has a 10 minute gel strength of at least 30 lb/100 ft$^2$ (1,436 Pa), alternatively greater than 50 lb/100 ft$^2$ (2,394 Pa) at a temperature of 120° F. (48.9° C.) and a time of 48 hours, preferably a time of 2 months. According to another embodiment, the suspending agent and the particulate are selected and are in a sufficient concentration such that the treatment fluid has a shear strength of at least 20 lb/100 ft$^2$ (958 Pa), alternatively greater than 30 lb/100 ft$^2$ (1,469 Pa), at a temperature of 200° F. (93.3° C.) and a time of 6 days, preferably a time of 2 months. In another embodiment, the particulate is in a concentration of at least 1 pounds per barrel (ppb) of the treatment fluid. The particulate can also be in a concentration in the range of about 0.25 to about 200 ppb of the treatment fluid. In an embodiment, the particulate is in a concentration in the range of about 2 to about 8 ppb of the treatment fluid.

The particulate can be selected from the group consisting of ground marble, sepiolite, calcium montmorillonite, solids from the formation, and combinations thereof. Commercially-available examples of suitable particulate include BARACARB® and TAU-MOD®, marketed by Halliburton Energy Services, Inc.

The treatment fluid can further include an emulsifier. The emulsifier can be selected from the group consisting of tall oil-based fatty acid derivatives, vegetable oil-based derivatives, and combinations thereof. Commercially-available examples of a suitable emulsifier include, but are not limited to, EZ MUL® NT, INVERMUL® NT, LE SUPERMUL®, and combinations thereof, marketed by Halliburton Energy Services, Inc. According to an embodiment, the emulsifier is in at least a sufficient concentration such that the treatment fluid maintains a stable invert emulsion. According to yet another embodiment, the emulsifier is in a concentration of at least 3 ppb of the treatment fluid. The emulsifier can also be in a concentration in the range of about 3 to about 20 ppb of the treatment fluid.

The treatment fluid can further include an emulsifier activator. The emulsifier activator aids the emulsifier in creating a stable invert emulsion. The emulsifier activator can be a base, such as lime. According to an embodiment, the emulsifier activator is in a concentration of at least 0.5 ppb of the treatment fluid. The emulsifier activator can also be in a concentration in the range of about 0.5 to about 3 ppb of the treatment fluid.

The treatment fluid can further include a weighting agent. The weighting agent can be selected from the group consisting of barite, hematite, manganese tetroxide, calcium carbonate, and combinations thereof. According to an embodiment, the weighting agent is not an organophilic clay or organophilic lignite. Commercially-available examples of a suitable weighting agent include, but are not limited to, BAROID®, BARODENSE®, MICROMAX™, and combinations thereof, marketed by Halliburton Energy Services, Inc. According to an embodiment, the weighting agent is in a concentration of at least 10 ppb of the treatment fluid. The weighting agent can also be in a concentration in the range of about 10 to about 500 ppb of the treatment fluid. According to another embodiment, the weighting agent is in at least a sufficient concentration such that the treatment fluid has a density in the range of about 9 to about 20 pounds per gallon (ppg) (about 1.078 to about 2.397 kilograms per liter "kg/L"). Preferably, the weighting agent is in at least a sufficient concentration such that the treatment fluid has a density in the range of about 9 to about 18 ppg (about 1.1 to about 2.4 kg/L).

The treatment fluid can further include a fluid loss additive. The fluid loss additive can be selected from the group consisting of methyl styrene-co-acrylate, a substituted styrene copolymer, and combinations thereof. Commercially-available examples of a suitable fluid loss additive include, but are not limited to, ADAPTA®, marketed by Halliburton Energy Services, Inc. According to an embodiment, the fluid loss additive is in at least a sufficient concentration such that the treatment fluid has an API fluid loss of less than 8 mL/30 min at a temperature of 300° F. (149° C.) and a pressure differential of 500 psi (3.4 megapascals "MPa"). The fluid loss additive can also be in at least a sufficient concentration such that the treatment fluid has an API fluid loss of less than 5 mL/30 min at a temperature of 300° F. (149° C.) and a pressure differential of 500 psi (3.4 MPa). According to another embodiment, the fluid loss additive is in a concentration of at least 0.5 ppb of the treatment fluid. The fluid loss additive can also be in a concentration in the range of about 0.5 to about 10 ppb of the treatment fluid.

The treatment fluid can also include a friction reducer. Commercially-available examples of a suitable friction reducer include, but are not limited to, TORQ-TRIM® II, graphitic carbon, and combinations thereof, marketed by Halliburton Energy Services, Inc. The friction reducer can be in a concentration of at least 0.5 ppb of the treatment fluid. In an embodiment, the friction reducer is in a concentration in the range of about 0.5 to about 5 ppb of the treatment fluid.

According to certain embodiments, the treatment fluid does not include an organophilic clay or organophilic lignite. The treatment fluid can contain organophilic clay, organophilic lignite, and combinations thereof. The treatment fluid can contain the organophilic clay or lignite at a concentration up to 1 pounds per barrel (ppb) of the treatment fluid. The treatment fluid can also contain the organophilic clay or lignite at a concentration in the range of 0 to about 20 ppb, alternatively of 0 to about 10 ppb, or alternatively from about 3 to about 8 ppb of the treatment fluid.

According to an embodiment, a test fluid consisting essentially of the external phase, the internal phase, the suspending agent, and the particulate, and in the same proportions as the treatment fluid, and after static aging for 2 months at a temperature of 200° F. (93.3° C.), has a 10 minute gel strength of at least 30 lb/100 ft² (1,436 Pa) at a temperature of 120° F. (48.9° C.). According to another embodiment, the test fluid consisting essentially of the external phase, the internal phase, the suspending agent, and the particulate, and in the same proportions as the treatment fluid, and after static aging for 2 months at a temperature of 200° F. (93.3° C.), has a shear strength of at least 20 lb/100 ft² at a temperature of 71° F. (21.7° C.). According to another embodiment, the treatment fluid has a 10 minute gel strength of at least 30 lb/100 ft² (1,436 Pa) at a temperature of 120° F. (48.9° C.) and a shear strength of at least 20 lb/100 ft² at a temperature of 71° F. (21.7° C.) and a time of 48 hours.

The treatment fluid can be, without limitation, a drilling fluid, a packer fluid, a completion fluid, a spacer fluid, or a work-over fluid. According to an embodiment, the treatment fluid is a packer fluid, used to contact a swellable packer or swellable bridge plug.

According to the method embodiments, the methods include the step of introducing the treatment fluid into at least a portion of a subterranean formation. Preferably, the at least a portion of the subterranean formation is a water-sensitive formation. More preferably, the at least a portion of the subterranean formation is a shale formation. The step of introducing the treatment fluid can be for the purpose of drilling a wellbore, completing the wellbore, or stimulating the wellbore. The step of introducing can include contacting a swellable packer or bridge plug with the treatment fluid. The treatment fluid can be in a pumpable state before and during introduction into the subterranean formation. The treatment fluid can form a gel after introduction into the subterranean formation. According to an embodiment, the treatment fluid is a fragile gel. The well can be an oil, gas, or water production well, or an injection well. The subterranean formation can include an annulus. The step of introducing the treatment fluid can include introducing the treatment fluid into a portion of the annulus.

The methods can also further include the step of introducing a cement composition into the at least a portion of the subterranean formation, wherein the step of introducing the cement composition is performed before or after the step of introducing the treatment fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the subterranean formation. The step of introducing can include introducing the cement composition into the well. According to another embodiment, the subterranean formation is penetrated by a well and the well includes an annulus. According to this other embodiment, the step of introducing can include introducing the cement composition into a portion of the annulus.

The method embodiments can also include the step of allowing the cement composition to set. The step of allowing can be performed after the step of introducing the cement composition into the subterranean formation. The methods can include the additional steps of perforating, fracturing, or performing an acidizing treatment, after the step of introducing the treatment fluid.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a treatment fluid is expressed as pounds per barrel of the treatment fluid (abbreviated as "ppb").

Each of the treatment fluids were mixed and tested according to the procedure for the specific test as described in The Detailed Description section above. Rheology testing, initial and 10 minute gel strength, plastic viscosity, yield point, and low-shear yield point tests were conducted at a temperature of 120° F. (48.9° C.) upon initial mixing of the fluid (#1) and after static at a temperature of 200° F. (93.3° C.) for 24 hours for fluid #2, 6 days for fluid #3, and 2 months for fluid #4. Stability testing was performed at 24 hours and at a temperature of 250° F. (121° C.) for treatment fluid #2, and at a temperature of 200° F. (93.3° C.) for treatment fluids #3 and #4. 10 second and 10 minute gel strengths were performed at a temperature of 120° F. (48.9° C.) upon initial mixing of the fluid (#1) and after static at a temperature of 200° F. (93.3° C.) for 24 hours for fluid #2, 6 days for fluid #3, and 2 months for fluid #4. Shear strength was conducted after static aging at a temperature of 200° F. (93.3° C.) at a time of 6 days for fluid #3 and 2 months for fluid #4. API fluid loss testing was conducted at a pressure differential of 500 psi (3.4 MPa) and a temperature of 250° F. (121° C.) for treatment fluid #2 and at a temperature of 200° F. (93.3° C.) for treatment fluid #4. Sag factors were determined after static aging for 24 hours at 250° F. (121.1° C.) for treatment fluid #1, for 6 days at 200° F. (93.3° C.) for treatment fluid #3, and for 2 months at a temperature of 200° F. (93.3° C.) for treatment fluid #4.

Table 1 contains a list of the ingredients and their respective concentrations for four different treatment fluids. Treatment fluids #1 and #2 had a density of 9 ppg (1.078 kg/L) and treatment fluids #3 and #4 had a density of 10 ppg (1.198 kg/L). All of the treatment fluids had a ratio of the external phase to the internal phase of 60:40 by volume. The internal phase for each of the treatment fluids contained fresh water and calcium chloride ($CaCl_2$) at a concentration in pounds per barrel (ppb) of the treatment fluid. The external phase for each of the treatment fluids was ESCAID® 110 paraffin hydrocarbon liquid and is expressed in units of barrels ("bbl"). Each of the treatment fluids also contained the following ingredients, listed at a concentration of ppb of the treatment fluid: EZ MUL® NT emulsifier; Lime emulsifier activator; RHEMOD L® viscosifier; ADAPTA® filter control agent; ADDITIN® M 10411 suspending agent; BAROID® weighting agent; and Priamine™1074 dimer diamine rheology modifier, available from Croda in New Castle, Del., USA. Treatment fluids #3 and #4 also contained the following additional ingredients as the particulate, in units of ppb: TAU-MOD®; REV DUST®; and BARAC-ARB®. The aforementioned additional ingredients were added to treatment fluid #2 after that fluid was static aged for 24 hours. Treatment fluid #3 was then static aged for an additional 5 days (for a total of 6 days) and then the fluid was static aged for a total of 2 months as treatment fluid #4.

TABLE 1

|  | 1 | 2 | 3 | 4 |
|---|---|---|---|---|
| ESCAID® 110 (bbl) | 0.414 | 0.414 | 0.414 | 0.414 |
| EZ MUL® NT | 8 | 8 | 8 | 8 |
| Lime | 1.5 | 1.5 | 1.5 | 1.5 |
| RHEMOD® | 3 | 3 | 3 | 3 |
| ADAPTA® | 2 | 2 | 2 | 2 |
| ADDITIN® M 10411 | 3 | 3 | 3 | 3 |
| $CaCl_2$ | 44.07 | 44.07 | 44.07 | 44.07 |
| Water | 126.9 | 126.9 | 126.9 | 126.9 |
| BAROID® | 41.56 | 41.56 | 41.56 | 41.56 |
| Priamine™ 1074 | 3 | 3 | 3 | 3 |
| TAU-MOD® |  |  | 5 | 5 |
| REV DUST® |  |  | 20 | 20 |
| BARACARB® |  |  | 50 | 50 |

Table 2 contains rheology data, plastic viscosity (PV), initial and 10 min gel strengths, shear strength, YP, and LSYP for the treatment fluids. As can be seen in Table 2, treatment fluid #4 had much higher rheology, PV, and gel strengths compared to fluids #1 and #2. This indicates that the addition of the low-density particulate to a fluid containing the suspending agent increases the gelling of the fluid. Treatment fluid #4 became a gel; however, the gel was broken by stirring the gel with a spatula. As can also be seen in Table 2, treatment fluids #3 and #4 (containing the low-density particulate) exhibited high shear strengths. This further indicates the gelling nature of the fluids. Thus, the combination of the suspending agent and the low-density particulate can be used to provide a gelled fluid compared to a fluid without the particulate.

TABLE 2

|  | 1 (Initial) | 2 (24 hrs) | 3 (6 days) | 4 (2 months) |
|---|---|---|---|---|
| 600 rpm | 53 | 46 |  | 205 |
| 300 rpm | 32 | 28 |  | 140 |
| 200 rpm | 24 | 22 |  | 115 |
| 100 rpm | 16 | 15 |  | 82 |
| 6 rpm | 5 | 4 |  | 34 |
| 3 rpm | 4 | 4 |  | 30 |
| Plastic Viscosity (cP) | 21 | 18 |  | 65 |
| Initial Gel Strength (lb/100 sq. ft.) | 5 | 5 |  | 37 |
| 10 min. Gel Strength (lb/100 sq. ft.) | 8 | 10 |  | 57 |
| Shear Strength (lb/100 sq. ft.) |  |  | 33.31 | 37.51 |
| Yield Point (lb/100 sq. ft.) | 11 | 10 |  | 75 |
| Low-Shear Yield Point | 3 | 4 |  | 26 |

Table 3 contains fluid loss data for two of the treatment fluids. As can be seen in Table 3, both treatment fluid #2 and #4 had an API fluid loss of 2. This indicates that the fluids provide excellent fluid loss control.

TABLE 3

|  | 1 (Initial) | 2 (24 hrs) | 3 (6 days) | 4 (2 months) |
|---|---|---|---|---|
| HTHP fluid loss (mL/30 min) |  | 2 |  | 2 |

Table 4 contains stability and sag factor data for some of the treatment fluids. It should be noted that only the treatment fluids that were considered "stable" were tested for the sag factor. As can be seen in Table 4, each of the stable treatment fluids had a sag factor of less than 0.53. This indicates that the fluid will remain stable and the undissolved solids will remain suspended in the fluid.

TABLE 4

|  | 1 (Initial) | 2 (24 hrs) | 3 (6 days) | 4 (2 months) |
|---|---|---|---|---|
| Stability |  | Stable | Stable | Stable |
| Sag Factor |  | 0.5 | 0.5 | 0.507 |

Table 5 contains biodegradability data for ADDITIN® M 10411 suspending agent with a ThOD concentration of 2.22 milligrams oxygen per milligrams (mg $O_2$/mg). As can be seen in Table 5, the suspending agent could be classified as inherently biodegradable as early as day 21. Moreover, at day 42, the suspending agent could be classified as inherently ultimate biodegradable.

TABLE 5

| Total % Degradation (Days) | | | | | |
|---|---|---|---|---|---|
| 7 | 14 | 21 | 28 | 35 | 42 |
| 17.8 | 14.0 | 24.2 | 38.2 | 54.8 | 71.4 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:
1. An invert emulsion treatment fluid comprising:
   (A) an external phase, wherein the external phase comprises a hydrocarbon liquid;
   (B) an internal phase, wherein the internal phase comprises a hygroscopic liquid;
   (C) a suspending agent, wherein the suspending agent is a polymer, and wherein the polymer comprises urea linkages; and
   (D) a particulate, wherein the particulate has a density less than 3.5 g/cm$^3$, wherein the particulate is in a concen- tration in the range of about 35 to about 200 pounds per barrel of the treatment fluid, wherein a test fluid consisting essentially of the external phase, the internal phase, the suspending agent, and the particulate, and in same proportions as the treatment fluid, and after static aging for 2 months at a temperature of 200° F. (93.3° C.), has a 10 minute gel strength of at least 30 lb/100 ft² (1,436 Pa) at a temperature of 120° F. (48.9° C.).

2. The fluid according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The fluid according to claim 1, wherein the hygroscopic liquid comprises an alcohol.

4. The fluid according to claim 3, wherein the alcohol comprises a glycerol.

5. The fluid according to claim 4, wherein the glycerol is polyglycerol.

6. The fluid according to claim 1, wherein the hygroscopic liquid comprises a salt and a suitable solvent.

7. The fluid according to claim 6, wherein the salt is selected from the group consisting of sodium chloride, calcium chloride, calcium bromide, potassium chloride, potassium bromide, magnesium chloride, potassium acetate, potassium formate, magnesium sulfate, and combinations thereof.

8. The fluid according to claim 6, wherein the solvent is selected such that the salt dissolves in the solvent to form a salt solution.

9. The fluid according to claim 1, wherein the internal phase is in a concentration in the range of about 0.5% to about 60% by volume of the external phase.

10. The fluid according to claim 1, wherein the internal phase further comprises water.

11. The fluid according to claim 10, wherein the water is in a concentration in the range of about 5% to about 90% by weight of the internal phase.

12. The fluid according to claim 1, wherein the polymer further comprises urethane linkages.

13. The fluid according to claim 1, wherein the suspending agent is in at least a sufficient concentration such that the treatment fluid has a sag factor less than or equal to 0.53.

14. The fluid according to claim 1, wherein the suspending agent is in a concentration in the range of about 0.25 to about 15 pounds per barrel of the treatment fluid.

15. The fluid according to claim 1, wherein the treatment fluid does not contain an organophilic clay or organophilic lignite.

16. The fluid according to claim 1, wherein the particulate has a density in the range of about 0.5 to about 3.5 g/cm³.

17. The fluid according to claim 1, wherein the test fluid has a shear strength of at least 20 lb/100 ft² at a temperature of 71° F. (21.7° C.).

18. The fluid according to claim 1, wherein the particulate is selected and is in a sufficient concentration such that the treatment fluid has a 10 minute gel strength of at least 30 lb/100 ft² (1,436 Pa) and a shear strength of at least 20 lb/100 ft² at a temperature of 71° F. (21.7° C.) at a time of 48 hours.

19. The fluid according to claim 1, wherein the particulate is selected from the group consisting of ground marble, sepiolite, calcium montmorillonite, solids from a formation, and combinations thereof.

20. An invert emulsion treatment fluid comprising:
(A) an external phase, wherein the external phase comprises a hydrocarbon liquid;
(B) an internal phase, wherein the internal phase comprises a hygroscopic liquid;
(C) a suspending agent, wherein the suspending agent is a polymer, wherein the polymer comprises urea linkages, and wherein the suspending agent is in a concentration in the range of about 0.25 to about 15 pounds per barrel of the treatment fluid; and
(D) a particulate, wherein the particulate has a density less than 3.5 g/cm³, wherein the particulate is in a concentration in the range of about 35 to about 200 pounds per barrel of the treatment fluid, and wherein the treatment fluid does not contain an organophilic clay or organophilic lignite.

* * * * *